United States Patent Office 3,408,001
Patented Oct. 29, 1968

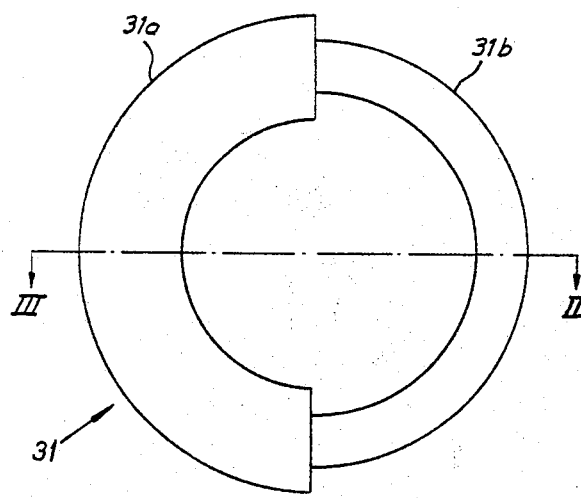
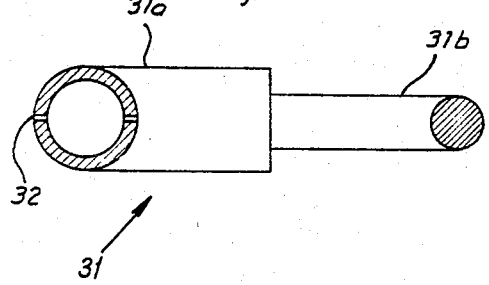

3,408,001
SLUDGE CENTRIFUGE
Vilgot Raymond Nilsson, Hagersten, Sweden, assignor to Alfa-Laval AB, Tumba, Sweden, a corporation of Sweden
Filed Oct. 10, 1966, Ser. No. 585,486
Claims priority, application Sweden, Oct. 18, 1965, 13,464/65
6 Claims. (Cl. 233—20)

ABSTRACT OF THE DISCLOSURE

Within the sludge-collecting space at the peripheral part of the centrifugal rotor is a sludge-displacing body so arranged that the center of gravity of its sludge-displacing volume is offset from the rotation axis of the rotor. Thus, as this body becomes immersed in separated sludge accumulating in the space, the center of gravity of the rotor and its content is displaced relative to the rotation axis and thereby indicates a change in the balance condition of the rotor, this change in turn indicating the extent of sludge accumulation in said space.

---

The present invention relates to centrifuges of the type in which sludge discharge takes place during operation when separating a sludge-containing liquid.

Various designs of centrifuges providing for intermittent sludge discharge are known in the art. When the sludge layer in the sludge space of the centrifugal rotor has reached a certain thickness, the sludge is discharged in order to make it possible to continue the separation. This discharge is effected by suitable operating means at intervals during the rotation of the rotor. However, it is a problem to determine when the maximum permissible thickness of the sludge layer, allowed for an acceptable operation of the centrifuge, has been reached. Another problem is to effect an automatic discharge of the sludge collected in the rotor when that maximum thickness is reached. Solutions of these two problems, as suggested heretofore, leave much to be desired.

An object of the present invention is to provide a sludge centrifuge which solves these problems in a simple and reliable manner.

According to the invention, a sludge displacing body is provided in the sludge space of the centrifugal rotor and is so arranged that as it becomes immersed in the sludge due to building up of the sludge layer toward the rotor axis, the resulting displacement of sludge by this body causes the center of gravity of the accumulating sludge to shift relative to the rotation axis of the rotor, thereby changing the balance of the rotor and, when this change becomes sufficiently great, indicating that the sludge level at which discharge should occur has been attained. The shape of that part of the sludge displacing body which faces the rotor axis is generally unimportant, since a sludge discharge should normally take place before the body has been completely immersed in sludge.

A centrifuge rotor should be balanced so that strong oscillations are avoided during its operation. This is also true for the centrifuge rotor provided with a sludge displacing body according to the present invention, regardless of whether the rotor is empty or is filled with liquid. When the sludge layer reaches this body and as the latter becomes immersed in the sludge, the center of gravity common to the centrifuge rotor and its content is displaced due to the shape of the body which displaces sludge, so that the condition of balance of the rotor is changed. The sludge displacing body can be arranged in either of two ways to effect this change of the rotor's balance in either of two directions, namely, in the direction of improving the balance or in the direction of increasing an unbalance. For this invention, it is important only that a change of the condition of balance occurs. When this change has become sufficiently large, the sludge should be discharged. This can take place in any conventional manner, as by hydraulic actuation of a valve piston which momentarily uncovers the sludge outlet openings.

It is preferable, in view of the balancing of the centrifuge rotor, that the center of gravity of the displacement body be located at the axis of rotation of the centrifuge. The body may be formed of a plurality of separate bodies or it may be formed in one piece.

A suitable manner of designing the displacement body according to the present invention is to provide it with at least one hollow space. In order to avoid a change of the condition of balance of the centrifuge rotor when liquid fills the rotor, the liquid should be able to occupy this hollow space. To this end, the wall of the hollow space is perforated by holes which are so small and so directed that sludge from the sludge layer will not enter the hollow space through the holes.

According to one embodiment, the displacement body is an annular ring one half of which is solid and the other half of which is tubular.

If the displacement body is designed so that it extends through the axis of rotation of the centrifuge rotor, and if the centrifuge is of the type in which the rotor is not completely filled with liquid in operation, then the part of the displacement body which, in operation, is located in the central air-filled hollow space in the centrifuge rotor may have its center of gravity located at the axis of rotation. In this way, complete balance prevails in the rotor when it is empty as well as when it is partially filled with liquid; but as the outer parts of the displacement body become immersed in sludge, a displacement of the center of gravity of the rotating mass occurs.

The change in the condition of balance of the centrifuge rotor, which indicates a suitable time for sludge discharge, can be determined in several different ways. For example, it can be determined by an operator who listens to the sound emitted from the rotating mass and who operates a suitable control for effecting sludge discharge when the sound changes markedly in intensity. Of course, a more exact method is preferable; and to this end a conventional instrument may be provided for sensing a predetermined change in the sound or oscillations of the rotating mass. The sludge discharge can be effected by conventional operating means controlled by the sensing instrument, whereby the sludge discharge occurs automatically when the sludge layer acquires a predetermined thickness sufficient to cause the aforesaid change. For example, the sludge discharge can be effected by hydraulic means conventionally used for this purpose, and the sensing instrument can be arranged to operate the control valve of the hydraulic means.

The present sludge displacing body can also be used to advantage in nozzle centrifuges when separating a sludge-containing liquid while recirculating sludge from the sludge discharge nozzles to the inlet of the centrifuge, so as to obtain a separated sludge having a desired degree of concentration. More exactly, the position of the sludge level corresponding to a certain degree of concentration of the sludge leaving the nozzle can be sensed by use of the sludge displacing body, and the sensed level value can be utilized so as to control the recirculation and the sludge concentration.

The invention is described more in detail below, reference being made to the accompanying drawings showing an example of the new centrifuge. In the drawings:

FIG. 2 is a plan view of the displacement body shown in FIG. 1; and

FIG. 3 is a sectional view along the line III—III in FIG. 2.

Figure 1:
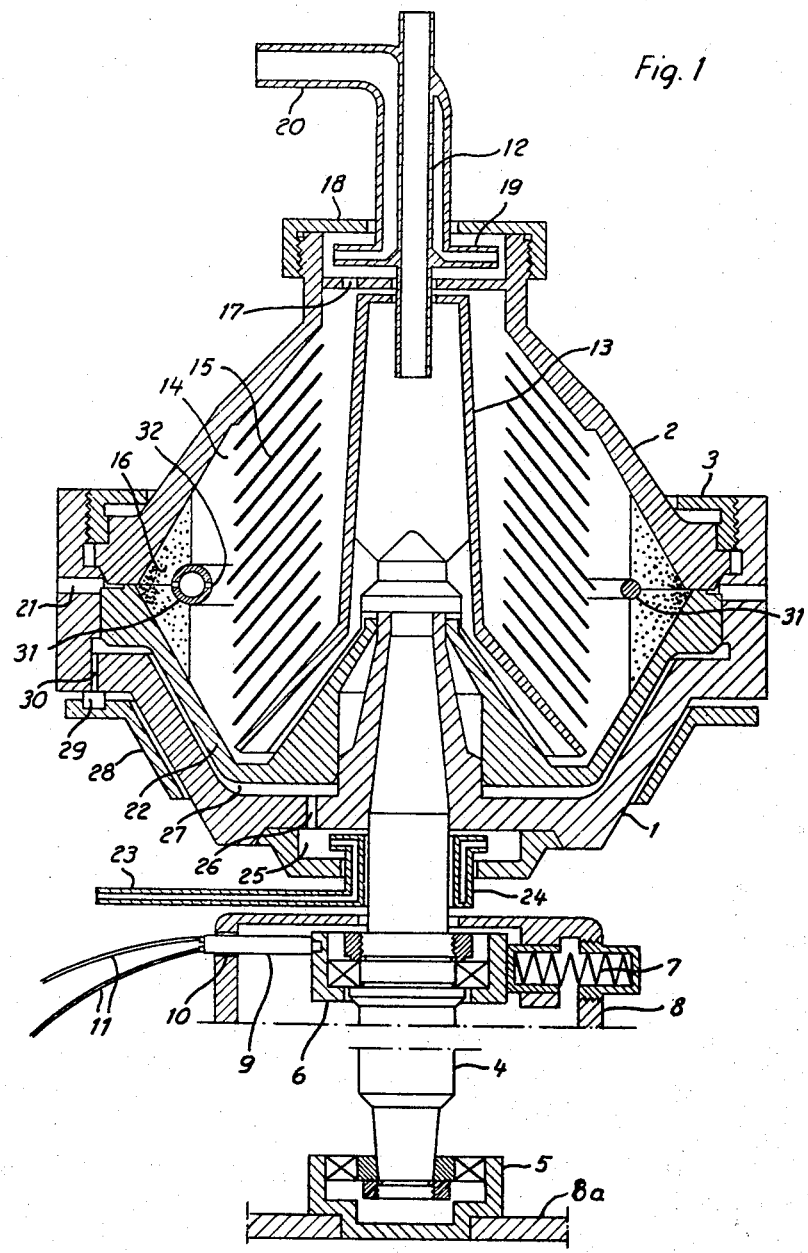
FIG. 1 is a vertical sectional view of the centrifuge.

In FIG. 1, the rotor body 1 has a cover 2 secured to the body by a threaded locking ring 3. The rotor is driven by a vertical shaft 4, the lower end of which is journalled in a bearing 5 secured to a stationary part 8a of the centrifuge frame. Below the rotor body 1 is an additional bearing 6 for the shaft 4. The bearing 6 is supported horizontally by a number of horizontal springs 7, for example six springs, distributed uniformly around the bearing and directed radially, these springs being mounted in a stationary wall 8 of the centrifuge frame. A conventional electric means 9 for sensing oscillations is secured to the sleeve of bearing 6 and can move without friction through a hole 10 in the frame wall. Electrical wires connected to the sensing means 9 are shown at 11. The sensing means 9 is of the type which, when oscillated, generates an alternating current, the voltage of which is proportional to the acceleration to which the sensing means is subjected.

The stationary inlet pipe for the sludge-containing liquid to be separated is shown at 12. The liquid entering the rotor 1 passes through a distributor 13 on its way to the separating space 14, in which a disk set 15 is inserted. Sludge separated from the liquid forms a sludge layer 16 in the sludge space, while liquid freed from sludge in the disk set enters a paring chamber 18 through a hole 17 and is discharged from chamber 18 by a stationary paring disk 19, the paring channel of which leads to an outlet 20. In the rotor wall are sludge outlet openings 21 which are opened and closed by a valve piston 22 movable axially of the rotor, that is, vertically. The closing movement of the piston 22 is effected by an operating liquid supplied through a duct 23, which opens into a stationary cylindrical body 24 provided with an annular channel. The operating liquid flows from the body 24 into a cylindrical hollow space 25 in the rotor bottom and from there through a hole 26 into a space 27 between the rotor body and the valve piston 22. A ring valve 28 is carried by the rotor and is biased upwardly, as by springs (not shown), to keep holes 30 in the rotor bottom closed by means of pads 29.

Under the influence of the centrifugal force, the operating liquid in the space 27 keeps the valve piston 22 closed. When sludge is to be discharged, the ring valve 28 is pressed downwardly in a known manner (not shown), for example hydraulically, so that the holes 30 are uncovered. The liquid in the space 27, under the influence of the centrifugal force, then flows rapidly outwardly through the holes 30. This allows the valve piston 22 to be displaced downwardly by the liquid pressure in the separating space 14, whereby the openings 21 are uncovered and sludge collected in the rotor is discharged. The closure of the valve piston 22 is effected by a closure of the ring valve 28 and a supply of liquid from duct 23 to the space 27.

In the sludge space 16 is a sludge-displacing body 31 having, in this example, the shape shown more particularly in FIGS. 2 and 3. As shown, the body 31 is annular and comprises a hollow or tubular semi-circular part 31a and an opposing semi-circular part 31b which is solid, the tubular part 31a having small holes 32 in its wall. The parts 31a and 31b are shown circular in cross-section, but the outer diameter of the tubular part 31a is substantially greater than the diameter of the solid part 31b.

The sludge displacing body 31 is held in fixed position relative to the rotor in any suitable manner, as by means of thin radial arms (not shown) disposed symmetrically around the body 31 and secured to the cover 2. Preferably, the center of gravity of the body 31 is located on the rotation axis of the centrifugal rotor.

In the operation of the centrifuge, the rotor 1–2 is satisfactorily balanced when it is rotating in empty condition, despite the non-uniform shape of the sludge-displacing body 31. When liquid fills the separating chamber or space 14, it enters the hollow space of the part 31a through the holes 32, thereby maintaining an unchanged condition of balance when the rotor is filled with liquid. As the sludge layer 16 grows inwardly towards the center of the rotor, more sludge is displaced by the larger part 31a than by the smaller part 31b. Since the sludge is of higher specific gravity (heavier per unit of volume) than the liquid, the center of gravity common to the rotor and its content is displaced to the right as viewed in FIG. 1, that is, toward the section of the rotor occupied by the part 31b which displaces the smaller volume of sludge. This displacement of the center of gravity changes the magnitude or strength of the horizontal oscillations of the shaft 4, thereby changing the accelerations to which the sensing means 9 are subjected. When the change has reached a value or amount predetermined empirically and corresponding to the sludge level at which a sludge discharge should take place, the sensing means 9 operate through conductors 11 to activate a conventional electrical impulsing device (not shown). The resulting electrical impulse may be used to actuate a visible or audible alarm but preferably is used to actuate the conventional means previously mentioned, such as hydraulic means, for effecting downward displacement of the ring valve 28 to cause discharge of sludge from the space 16, the valve 28 then being released after a predetermined time sufficient for the desired sludge discharge.

As will be observed from the foregoing, the sludge-displacing volume of the body 31 has its center of gravity offset from the rotation axis of the rotor, whereby the center of gravity of the entire rotating mass is changed relative to that axis as the body 31 becomes immersed in sludge; and the change thus caused serves for determining when discharge of the sludge should be initiated.

I claim:

1. In a sludge centrifuge, the combination of a centrifugal rotor having an inlet for sludge-containing liquid and a separating chamber communicating with said inlet, the rotor also having a peripheral space for receiving sludge separated in said chamber, the rotor also having a peripheral outlet for discharging separated sludge from said space during operation of the rotor, and a sludge-displacing body substantially fixed in said sludge space and having the center of gravity of its sludge-displacing volume offset from the rotation axis of the rotor, whereby immersion of said body in separated sludge received in said space causes displacement of the center of gravity of the rotor and its content relative to said axis, thereby indicating a change in the balance condition of the rotor.

2. The combination according to claim 1, in which the center of gravity of the weight of the cludge-displacing body is located on said rotation axis.

3. The combination according to claim 1, in which the sludge-displacing body has a hollow portion forming a sub-space in said sludge-receiving space.

4. The combination according to claim 3, in which the sludge-displacing body is perforated to allow liquid to enter said sub-space.

5. The combination according to claim 1, in which the sludge-displacing body is in the general shape of a ring having a tubular sector and a solid sector, the ring being perforated to admit liquid to the interior of said tubular sector.

6. The combination according to claim 1 comprising also means for sensing a change in the balance condition of the rotor resulting from said displacement of the center of gravity.

References Cited

UNITED STATES PATENTS

| | | | |
|---|---|---|---|
| 2,955,754 | 10/1960 | Nyrop | 233—20 |
| 3,255,958 | 6/1966 | Simon | 233—20 |
| 3,341,093 | 9/1967 | Putterlik | 233—20 |

FOREIGN PATENTS 621,908   11/1935   Germany.

HENRY T. KLINKSIEK, *Primary Examiner.*